US010367428B2

(12) United States Patent
Tsuchiya

(10) Patent No.: US 10,367,428 B2
(45) Date of Patent: Jul. 30, 2019

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Taichiro Tsuchiya, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 42 days.

(21) Appl. No.: 15/735,870

(22) PCT Filed: Jun. 15, 2015

(86) PCT No.: PCT/JP2015/067156
§ 371 (c)(1),
(2) Date: Dec. 12, 2017

(87) PCT Pub. No.: WO2016/203517
PCT Pub. Date: Dec. 22, 2016

(65) Prior Publication Data
US 2019/0157968 A1    May 23, 2019

(51) Int. Cl.
*H02M 7/483*    (2007.01)
*H02M 1/00*    (2006.01)

(52) U.S. Cl.
CPC .... *H02M 7/483* (2013.01); *H02M 2001/0006* (2013.01); *H02M 2007/4835* (2013.01)

(58) Field of Classification Search
CPC . H02M 2007/4835; H02M 2001/0006; H02M 1/32; G05F 1/613; G05F 1/614
See application file for complete search history.

(56) References Cited

U.S. PATENT DOCUMENTS

2008/0198630 A1    8/2008    Hiller
2011/0019442 A1*    1/2011    Yamada .................. H02M 1/14
                                                    363/44

(Continued)

FOREIGN PATENT DOCUMENTS

CN    102856909 B    4/2015
JP    07-163044 A    6/1995

(Continued)

OTHER PUBLICATIONS

Office Action dated Jul. 31, 2018 in Japanese Patent Application No. 2017-524157 with English translation.

(Continued)

*Primary Examiner* — Fred E Finch, III
*Assistant Examiner* — Rafael O. De León Domenech
(74) *Attorney, Agent, or Firm* — Oblon, McClelland, Maier & Neustadt, L.L.P.

(57) ABSTRACT

An MMC includes arms configured with one unit converter or a plurality of cells connected in series. The main circuit of the cell includes a switching element and a DC capacitor. The power supply of the cell lowers voltage of the DC capacitor to generate power supply voltage to be supplied to the control circuit of the cell. The power supply includes a power supply circuit configured to convert input voltage provided between first and second input terminals from the DC capacitor into power supply voltage, a thyristor connected between the first and second input terminals electrically in parallel with the power supply circuit, a current-limiting resistor connected between terminals of the DC capacitor electrically in series with the thyristor, and a control unit configured to fire the thyristor when input voltage applied to the power supply circuit exceeds a threshold voltage.

4 Claims, 16 Drawing Sheets

(56) References Cited

U.S. PATENT DOCUMENTS

| | | | |
|---|---|---|---|
| 2012/0113698 A1* | 5/2012 | Inoue | H02M 1/08 363/123 |
| 2013/0208519 A1* | 8/2013 | Yamamoto | H02M 7/12 363/67 |
| 2014/0002933 A1* | 1/2014 | Gao | H02M 1/32 361/18 |

FOREIGN PATENT DOCUMENTS

| | | |
|---|---|---|
| JP | 2013-027260 A | 2/2013 |
| WO | 2007-025828 A1 | 3/2007 |

OTHER PUBLICATIONS

International Search Report dated Sep. 8, 2015, in PCT/JP2015/067156 filed Jun. 15, 2015.
Extended European Search Report dated Dec. 17, 2018 in Patent Application No. 15895538.5, 8 pages.

* cited by examiner

FIG.6
(a)
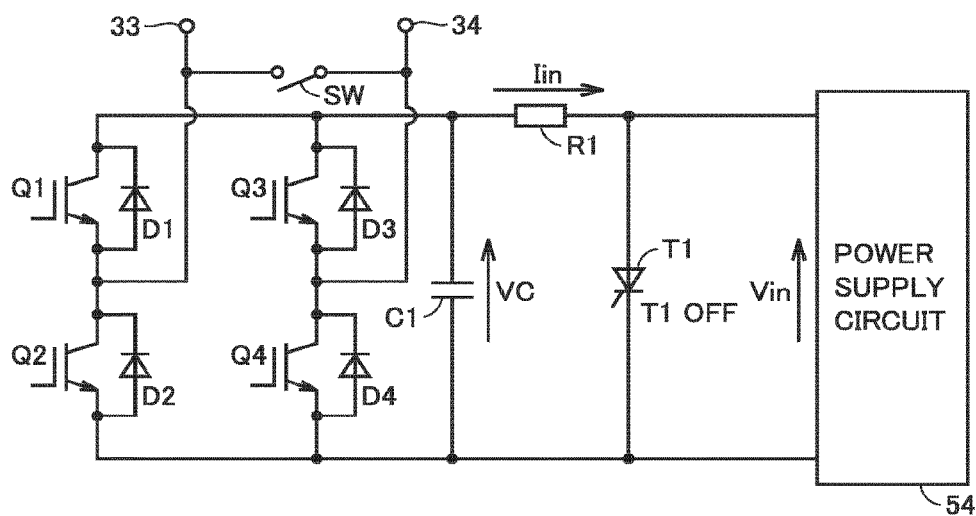
(b)
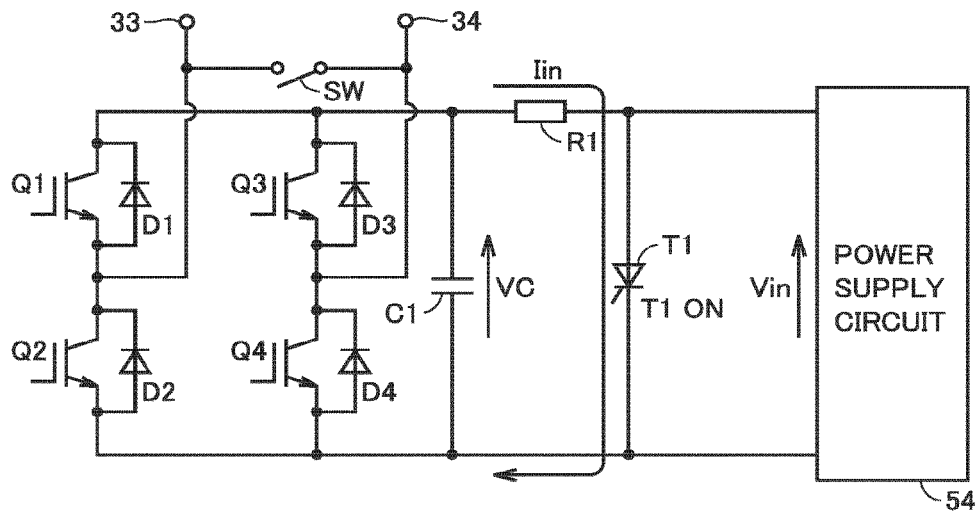

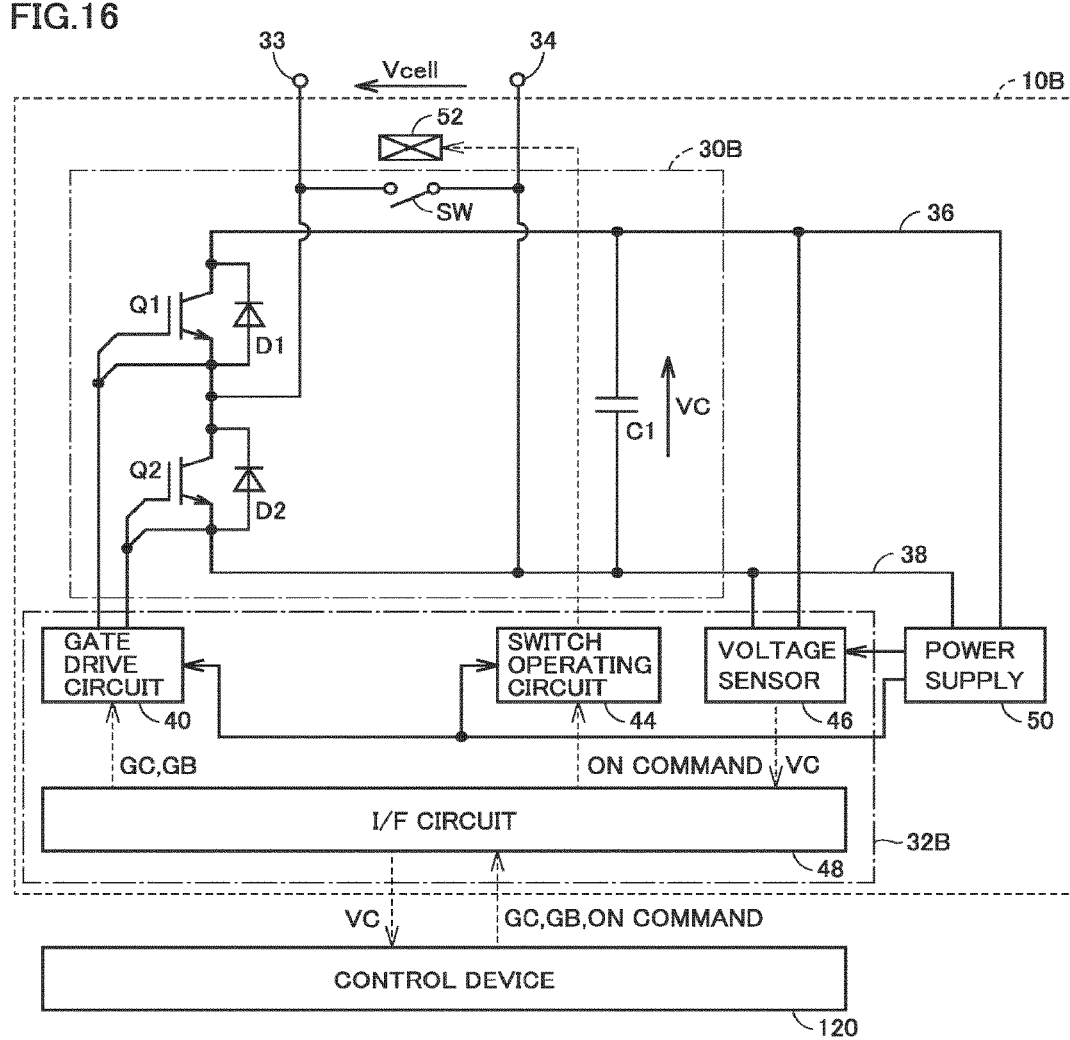

POWER CONVERSION DEVICE

TECHNICAL FIELD

The present invention relates to a power conversion device and more specifically to a power conversion device configured with one unit converter or a plurality of unit converters connected in series.

BACKGROUND ART

In recent years, the use of MMCs (Modular Multilevel Converters) has been contemplated in self-commutated static var compensators such as STATCOM (Static Synchronous Compensator), direct-current transmission systems such as BTB (Back to Back) system, and motor drive inverters (for example, see WO2007/025828 (PTD 1)).

The MMC is configured with a plurality of unit converters connected in series. Each unit converter includes a switching element and a direct-current (DC) capacitor. The unit converter allows the switching element to perform switching operation to output voltage of the DC capacitor to the output terminal. In general, a semiconductor switching element capable of on/off control, such as IGBT (Insulated Gate Bipolar Transistor), is used as a switching element.

CITATION LIST

Patent Document

PTD 1: WO2007/025828

SUMMARY OF INVENTION

Technical Problem

The unit converter included in the MMC includes a control circuit for controlling on/off of the switching element in cooperation with a control device on the higher level for controlling the entire MMC. A configuration has been contemplated in which a power supply for generating power supply voltage to be supplied to the control circuit is provided for each converter. The power supply is configured to lower the voltage of the DC capacitor to generate power supply voltage.

Unfortunately, in the configuration in which a power supply is provided for each unit converter as described above, when abnormality such as overcharge of the DC capacitor occurs, voltage exceeding a permissible voltage may be input to the power supply. This may lead to destruction of circuit components of the power supply and the control circuit.

The present invention is made to solve the problem as described above, and an object of the present invention is to prevent destruction of circuit components in a unit converter due to input overvoltage to the power supply provided for each unit converter in a power conversion device configured with one or more unit converters connected in series.

Solution to Problem

A power conversion device according to an aspect of the present invention includes a power converter including an arm configured with one unit converter or a plurality of unit converters connected in series, and a control device configured to control the power converter. The unit converter includes a main circuit, a control circuit, and a power supply. The main circuit includes a switching element and a DC capacitor and outputs a voltage pulse according to voltage of the DC capacitor by turning on/off of the switching element. The control circuit is configured to control on/off of the switching element in accordance with a control signal received from the control device. The power supply lowers voltage of the DC capacitor to generate power supply voltage to be supplied to the control circuit. The power supply includes a power supply circuit. The power supply circuit is configured to convert input voltage provided between first and second input terminals from the DC capacitor into the power supply voltage. The power supply further includes a thyristor connected between the first and second input terminals electrically in parallel with the power supply circuit, a current-limiting resistor connected between terminals of the DC capacitor electrically in series with the thyristor, and a control unit configured to fire the thyristor when the input voltage applied to the power supply circuit exceeds a threshold voltage.

Advantageous Effects of Invention

According to the present invention, in a power conversion device including an arm configured with one or more unit converters connected in series, even when a communication error between the control device and the unit converter occurs, each unit converter can be protected.

BRIEF DESCRIPTION OF DRAWINGS

FIG. 6 is a diagram showing the state of the power supply when a short-circuit thyristor is in the off state (FIG. 6(a)) and when the short-circuit thyristor is in the on state (FIG. 6(b)).

FIG. 16 is a diagram showing another configuration example of the cell shown in FIG. 1.

DESCRIPTION OF EMBODIMENTS

Embodiments of the present invention will be described in detail below with reference to the figures. In the following, the same or corresponding parts in the figures are denoted by the same reference signs and a description thereof will basically not be repeated.

First Embodiment (Configuration of Power Conversion Device)

Figure 1:
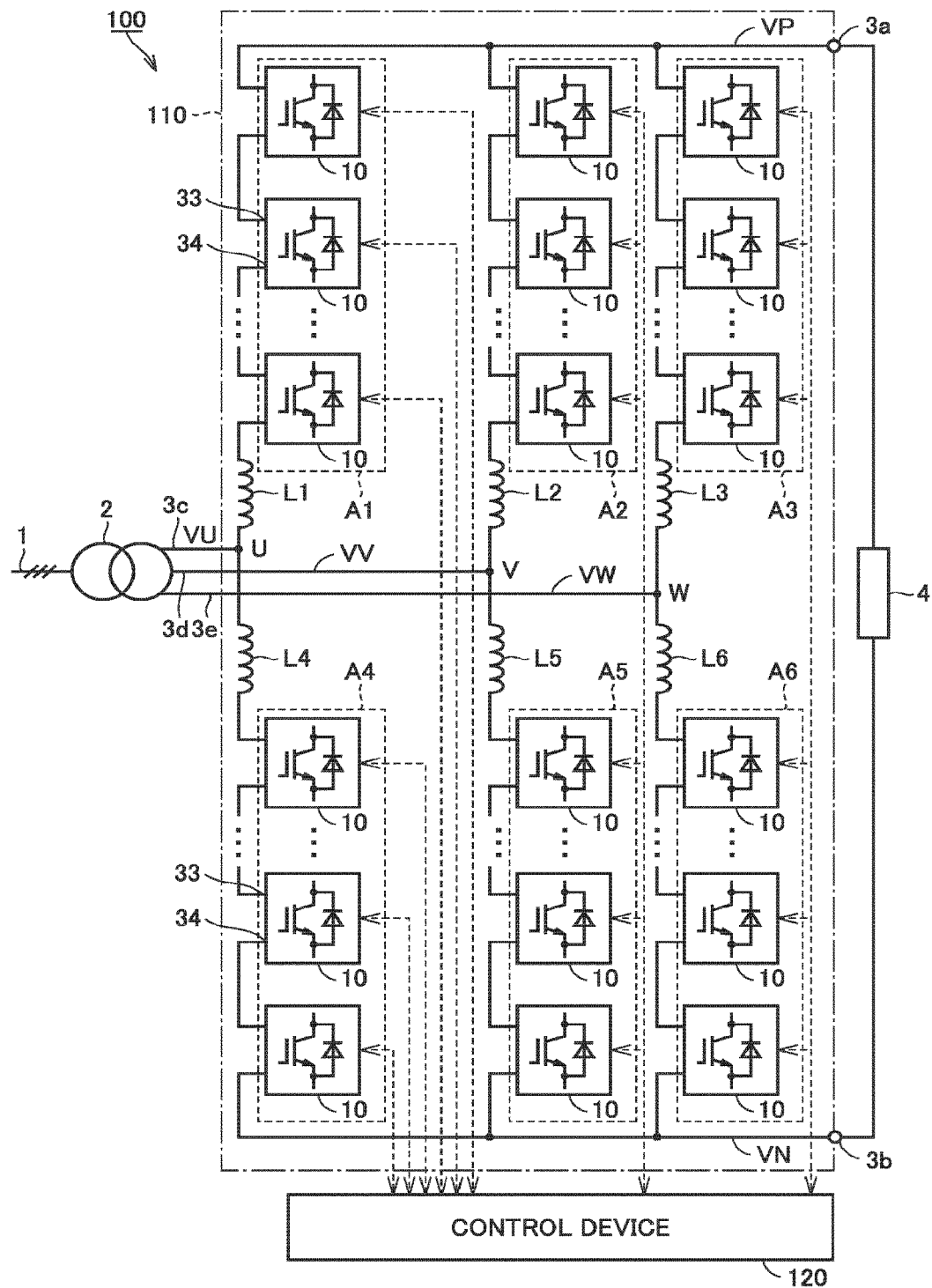
FIG. 1 is an overall configuration diagram of a power conversion device according to a first embodiment of the present invention.

FIG. 1 is an overall configuration diagram of a power conversion device according to a first embodiment of the present invention. Referring to FIG. 1, a power conversion device 100 includes a modular multilevel converter (MMC) 110 and a control device 120 for controlling MMC 110.

MMC 110 includes a positive voltage terminal 3a, a negative voltage terminal 3b, and three alternating-current (AC) terminals 3c to 3e. MMC 110 is a bidirectional power conversion device that converts one of direct-current (DC) power and three-phase AC power into the other. Positive voltage terminal 3a and negative voltage terminal 3b are used for receiving DC power. Three AC terminals 3c to 3e are used for receiving three-phase AC power. MMC 110 corresponds to an embodiment of "power converter" in the present invention.

Positive voltage terminal 3a and negative voltage terminal 3b are connected to a load 4. Examples of load 4 applied include DC loads, DC power supplies, and motor drive inverters.

Three AC terminals 3c to 3e are connected to three secondary terminals of a three-phase transformer 2. The primary terminals of three-phase transformer 2 are connected to three-phase power transmission lines of an AC power system 1 through a not-shown breaker. The breaker is in a conducting state during normal operation and enters a non-conducting state, for example, when a short-circuit accident occurs between terminals 3a and 3b.

When power is supplied from AC power system 1 to load 4, three-phase AC power of AC power system 1 is supplied to MMC 110 through three-phase transformer 2. MMC 110 converts three-phase AC power into DC power. The converted DC power is supplied to load 4. That is, MMC 110 operates as an AC-DC conversion device that converts AC power into DC power.

On the other hand, when power is supplied from load 4 to AC power system 1, DC power is supplied from load 4 to MMC 110. MMC 110 converts DC power into three-phase AC power. The converted three-phase AC power is supplied to AC power system 1 through three-phase transformer 2. That is, MMC 110 operates as a DC-AC conversion device that converts DC power into AC power.

MMC 110 further includes arms A1 to A6 and reactors L1 to L6. Arms A1 to A3 have one terminals connected together to positive voltage terminal 3a and the other terminals connected respectively to one terminals of reactors L1 to L3. The other terminals of reactors L1 to L3 are connected to AC terminals 3c to 3e, respectively.

Arms A4 to A6 have one terminals connected together to negative voltage terminal 3b and the other terminals connected respectively to one terminals of reactors L4 to L6. Reactors L4 to L6 have the other terminals connected to AC terminals 3c to 3e, respectively.

Positive voltage terminal 3a is supplied with positive DC voltage VP from MMC 110 and load 4. Negative voltage terminal 3b is supplied with negative DC voltage VN from MMC 110 and load 4. AC terminal 3c is supplied with U-phase AC voltage VU from three-phase transformer 2 and MMC 110. AC terminal 3d is supplied with V-phase AC voltage VV from three-phase transformer 2 and MMC 110. AC terminal 3e is supplied with W-phase AC voltage VW from three-phase transformer 2 and MMC 110. The phases of three-phase AC voltages VU, VV, VW are shifted from each other by 120 degrees.

Arms A1 and A4 constitute a U-phase module that performs bidirectional power conversion between U-phase AC voltage VU and DC voltages VP, VN. Arms A2 and A5 constitute a V-phase module that performs bidirectional power conversion between V-phase AC voltage VV and DC voltages VP, VN. Arms A3 and A6 constitute a W-phase module that performs bidirectional power conversion between W-phase AC voltage VW and DC voltages VP, VN.

The inductance of reactors L1 to L6 is set to a value necessary for controlling current flowing through each arm A and for suppressing cyclic current flowing between the three phase modules when the amplitudes of AC voltages VU, VV, VW differ.

(Configuration of Unit Converter)

Figure 2:
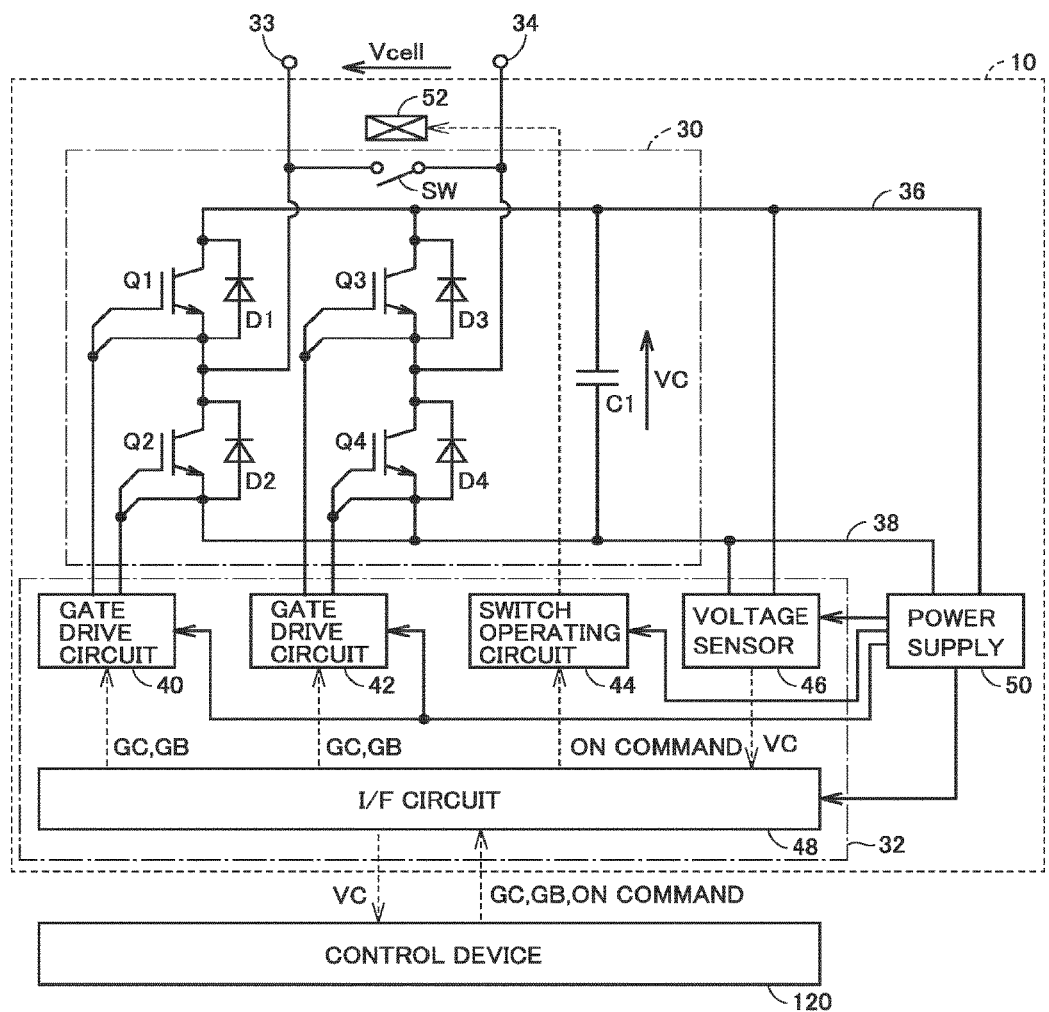
FIG. 2 is a diagram showing a configuration example of the cell shown in FIG. 1.

Each of arms A1 to A6 includes a plurality of cascaded unit converters (hereinafter also referred to as cells) 10. FIG. 2 is a diagram showing a configuration example of cell 10 shown in FIG. 1. Referring to FIG. 2, cell 10 includes a main circuit 30, a cell control circuit 32, and a power supply 50.

Main circuit 30 is configured with a full-bridge circuit including a DC capacitor. Specifically, main circuit 30 is a two-terminal circuit having a first terminal 33 and a second terminal 34. Main circuit 30 includes switching elements Q1 to Q4, diodes D1 to D4, and a DC capacitor C1.

Switching elements Q1 to Q4 each are a self-commutated power semiconductor device and formed of, for example, an IGBT. Switching elements Q1, Q2 are connected in series between a power line pair (positive electrode line 36 and negative electrode line 38). Switching elements Q3, Q4 are connected in series between the power line pair. The collectors of switching elements Q1, Q3 are connected together to positive electrode line 36, and the emitters of switching elements Q2, Q4 are connected together to negative electrode line 38. The connection point between the emitter of switching element Q1 and the collector of switching element Q2 is connected to first terminal 33. The connection point between the emitter of switching element Q3 and the collector of switching element Q4 is connected to second terminal 34.

Diodes D1 to D4 are connected in anti-parallel with switching elements Q1 to Q4, respectively. DC capacitor C1 is connected between positive electrode line 36 and negative electrode line 38. DC capacitor C1 smoothes the output of the full-bridge circuit.

As shown in FIG. 1, first terminals 33 of cells 10 positioned at one ends of arms A1 to A3 are connected together to positive voltage terminal 3a. In arms A1 to A3, second terminal 34 of each cell 10 is connected to first terminal 33 of cell 10 adjacent on the AC terminal 3c to 3e side. Second terminals 34 of cells 10 positioned on the other ends of arms A1 to A3 are connected to one terminals of reactors L1 to L3, respectively.

First terminals 33 of cells 10 positioned on one ends of arms A4 to A6 are connected to one terminals of reactors L4 to L6, respectively. In arms A4 to A6, second terminal 34 of each cell 10 is connected to first terminal 33 of cell 10 adjacent on the negative voltage terminal 3b side. Second terminals 34 of cells 10 positioned on the other ends of arms A4 to A6 are connected together to negative voltage terminal 3b.

In cell 10, switching elements Q1, Q2 are alternately turned on and off. Switching elements Q3, Q4 are alternately turned on and off. As shown in FIG. 2, when the voltage to first terminal 33 with reference to second terminal 34 is defined as cell voltage Vcell, cell voltage Vcell is controlled by the on/off state of switching elements Q1 to Q4.

Specifically, when switching elements Q1, Q2 are turned on and off, respectively, and switching elements Q3, Q4 are turned off and on, respectively, cell voltage Vcell is approximately equal to voltage VC of DC capacitor C1. When switching elements Q1, Q2 are turned on and off, respectively, and switching elements Q3, Q4 are turned on and off, respectively, cell voltage Vcell is approximately zero. When switching elements Q1, Q2 are turned off and on, respectively, and switching elements Q3, Q4 are turned off and on, respectively, cell voltage Vcell is approximately zero. When switching elements Q1, Q2 are turned off and on, respectively, and switching elements Q3, Q4 are turned on and off, respectively, cell voltage Vcell is approximately equal to a voltage with a reverse polarity of voltage VC of DC capacitor C1.

When all switching elements Q1 to Q4 are off, cell voltage Vcell is determined depending on the polarity of current flowing through cell 10. When current is positive, cell voltage Vcell is approximately equal to voltage VC of DC capacitor C1. When current is negative, cell voltage Vcell is approximately equal to a voltage with a reverse polarity of voltage VC of DC capacitor C1.

The voltage between two terminals of each arm A is represented by the sum of cell voltages Vcell of cells 10 included in this arm A. Therefore, the voltage of each arm A can be controlled by the on/off state of switching elements Q1 to Q4 included in cell 10.

Main circuit 30 further includes a switch SW. Switch SW is connected between first terminal 33 and second terminal 34. Switch SW is configured to turn on (closed) in response to an on command (close command) from cell control circuit 32 to short-circuit first terminal 33 and second terminal 34. That is, turning on switch SW allows the output of cell 10 to be short-circuited. Switch SW corresponds to an embodiment of "switch" in the present invention.

Cell control circuit 32 includes gate drive circuits 40, 42, a switch operating circuit 44, a voltage sensor 46, and an I/F (interface) circuit 48.

I/F circuit 48 communicates with control device 120 through a not-shown optical fiber cable. I/F circuit 48 receives a gate signal GC for controlling the full-bridge circuit of main circuit 30 from control device 120. I/F circuit 48 further receives a gate block signal GB for stopping switching operation of switching elements Q1 to Q4 (turning off all) included in the full-bridge circuit from control device 120. I/F circuit 48 outputs the received gate signal GC and gate block signal GB to gate drive circuits 40, 42.

Gate drive circuit 40 controls on/off of switching elements Q1, Q2 in response to gate signal GC. Alternatively, gate drive circuit 40 sets switching elements Q1, Q2 to a state fixed to the off state (stop state) in response to gate block signal GB.

Gate drive circuit 42 controls on/off of switching elements Q3, Q4 in response to gate signal GC. Alternatively, gate drive circuit 42 sets switching elements Q3, Q4 to a state fixed to the off state in response to gate block signal GB.

Switch operating circuit 44 is a circuit for operating on/off of switch SW. An excitation coil 52 is provided such that switch SW is turned off (opened) during non-energization. Switch operating circuit 44 controls energization to excitation coil 52 in response to a command from control device 120. During normal operation, since current supply to excitation coil 52 is stopped, switch SW is in the off state. On the other hand, when abnormality such as a short-circuit failure in a switching element is detected in any cell 10 of a plurality of cells 10, control device 120 outputs an on command for switch SW to the failed cell 10. In the failed cell 10, I/F circuit 48 receives and outputs the on command to switch operating circuit 44. In response to the on command, switch operating circuit 44 supplies current to excitation coil 52 to turn on switch SW. The output of the failed cell 10 is then short-circuited.

Voltage sensor 46 detects voltage VC of DC capacitor C1 and outputs the detected value to I/F circuit 48. I/F circuit 48 transmits voltage VC detected by voltage sensor 46 to control device 120.

Power supply 50 is connected in parallel with DC capacitor C1. Power supply 50 lowers voltage VC of DC capacitor C1 to generate power supply voltage to be supplied to cell control circuit 32. That is, each cell 10 is capable of supplying power from main circuit 30 to cell control circuit 32 and forms a self-feeding cell.

(Configuration of Power Supply)

Figure 3:
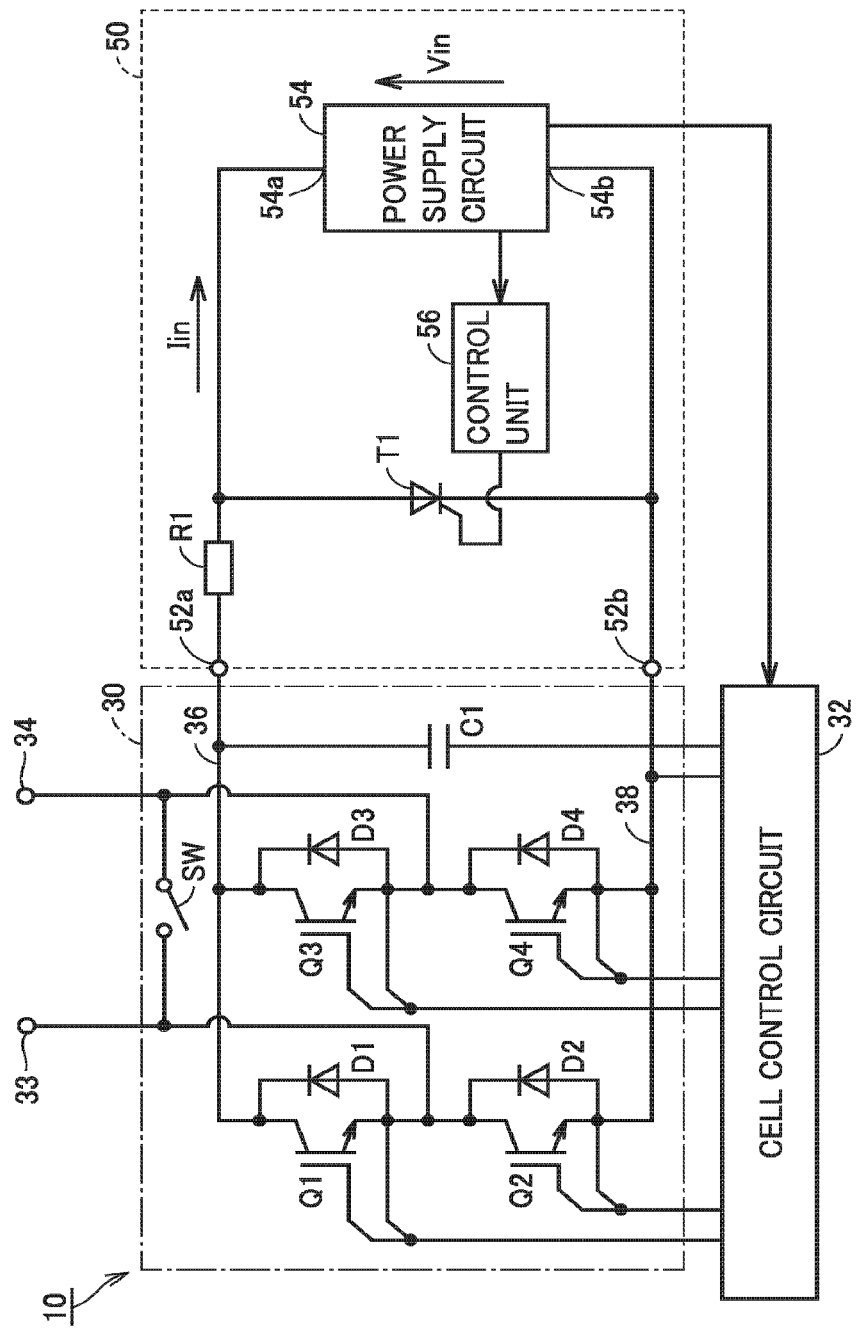
FIG. 3 is a diagram showing a configuration of the power supply shown in FIG. 2.

FIG. 3 is a diagram showing a configuration of power supply 50 shown in FIG. 2. Referring to FIG. 3, power supply 50 includes a positive electrode terminal 52a, a negative electrode terminal 52b, a power supply circuit 54, a thyristor T1, a current-limiting resistor R1, and a control unit 56.

Positive electrode terminal 52a is connected to positive electrode line 36 of main circuit 30. Negative electrode terminal 52b is connected to negative electrode line 38 of main circuit 30. Power supply 50 receives voltage VC of DC capacitor C1 between positive electrode terminal 52a and negative electrode terminal 52b.

Power supply circuit 54 includes a first input terminal 54a and a second input terminal 54b. First input terminal 54a is electrically connected to positive electrode terminal 52a, and second input terminal 54b is electrically connected to negative electrode terminal 52b. Power supply circuit 54 converts input voltage Vin provided between first input terminal 54a and second input terminal 54b from DC capacitor C1 into power supply voltage of cell control circuit 32. Power supply circuit 54 further converts input voltage Vin into power supply voltage to be supplied to control unit 56.

Thyristor T1 is connected between first input terminal 54a and second input terminal 54b of power supply circuit 54 electrically in parallel with power supply circuit 54. Thyristor T1 has its anode electrically connected to first input terminal 54a and its cathode electrically connected to second input terminal 54b.

Thyristor T1 is fired (turned on) in response to a firing signal input from control unit 56 to the gate. Thyristor T1 turned on is extinguished (turned off) in response to current becoming zero with the firing signal cut off. Turning on of thyristor T1 causes an electrical short-circuit of first input terminal 54a and second input terminal 54b in power supply circuit 54. In the following description, thyristor T1 is also referred to as "short-circuit thyristor".

Current-limiting resistor R1 is connected between positive electrode terminal 52a and negative electrode terminal 52b, that is, between the terminals of DC capacitor C1, electrically in series with thyristor T1. Even when the order in which current-limiting resistor R1 and thyristor T1 are connected is reversed, an electrically equivalent circuit configuration is formed.

Control unit 56 receives supply of power supply voltage from power supply circuit 54 to control on/off of short-circuit thyristor T1. The control structure of control unit 56 will be described later.

(Configuration of Power Supply Circuit)

Figure 4:
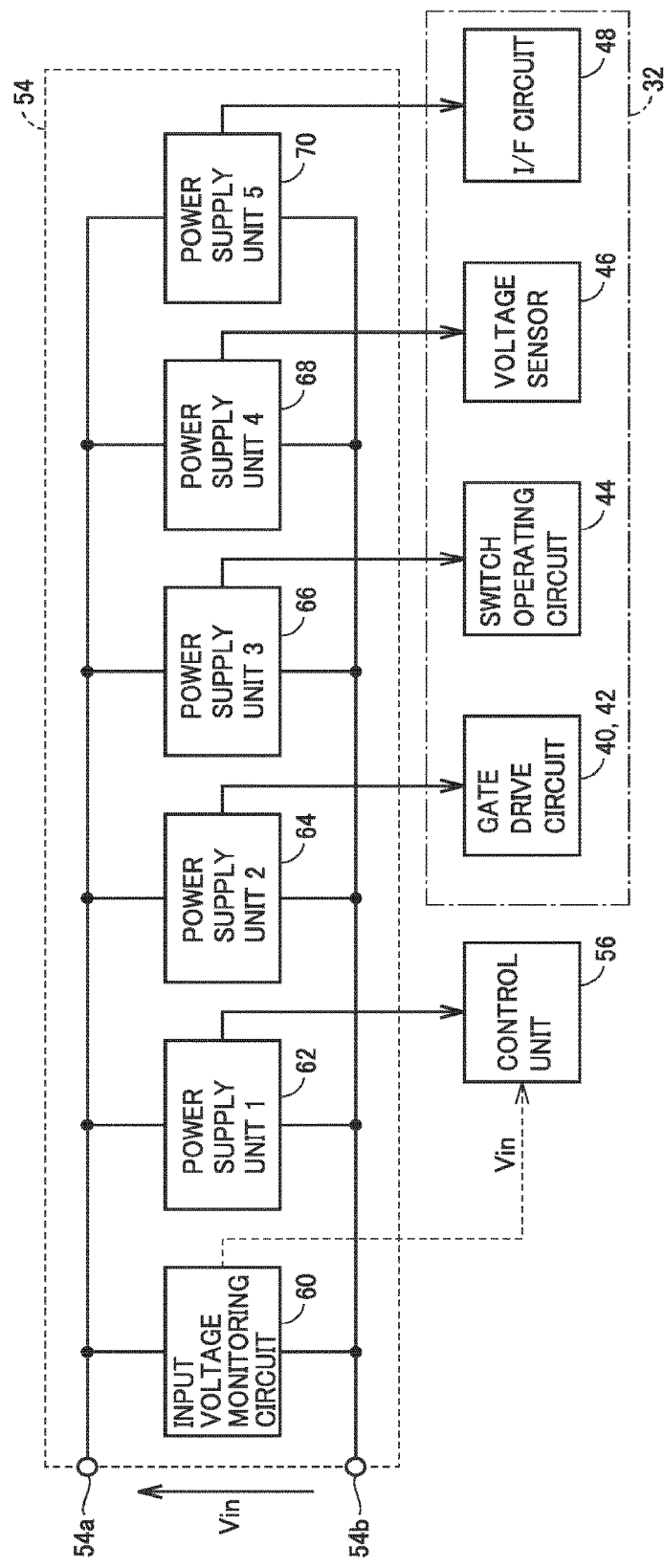
FIG. 4 is a block diagram showing a configuration of the power supply circuit shown in FIG. 3.

FIG. 4 is a block diagram showing a configuration of power supply circuit 54 shown in FIG. 3. Referring to FIG. 4, power supply circuit 54 includes a plurality of power supply units 62 to 70 for generating power supply voltage to be supplied to each unit in cell control circuit 32 and control unit 56. Specifically, first power supply unit 62 converts input voltage Vin supplied from input terminals 54a, 54b into power supply voltage of control unit 56. Second power supply unit 64 converts input voltage Vin into power supply voltage of gate drive circuits 40, 42. Third power supply unit 66 converts input voltage Vin into power supply voltage of switch operating circuit 44. Fourth power supply unit 68 converts input voltage Vin into power supply voltage of voltage sensor 46. Fifth power supply unit 70 converts input voltage Vin into power supply voltage of I/F circuit 48.

Power supply circuit 54 further includes an input voltage monitoring circuit 60 as a configuration for detecting the state in which input voltage Vin exceeds the permissible voltage of power supply circuit 54 (hereinafter also referred to as "input overvoltage state"). Input voltage monitoring circuit 60 detects input voltage Vin and outputs the detected value to control unit 56. Control unit 56 controls on/off of short-circuit thyristor T1 based on the detected value of input voltage Vin.

(Configuration of Control Unit)

Figure 5:
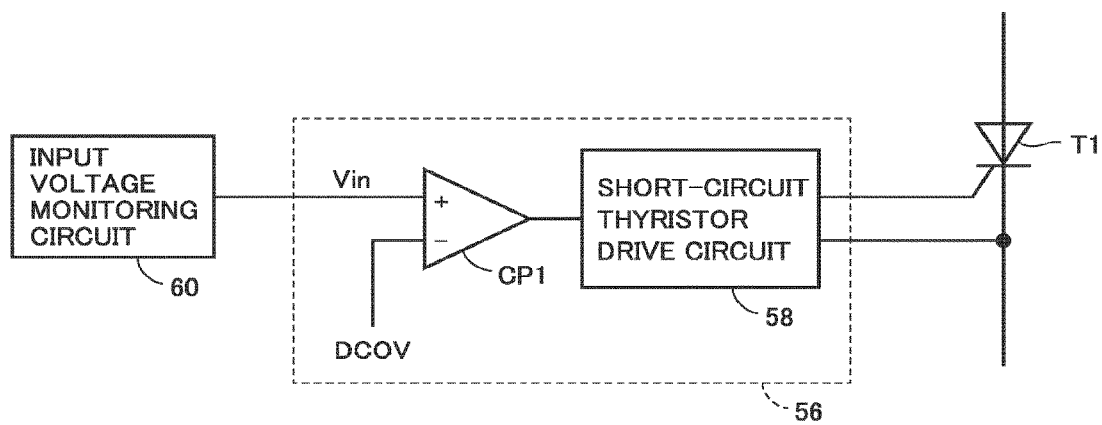
FIG. 5 is a block diagram showing a control configuration of the control unit of the power supply.

FIG. 5 is a block diagram showing a control configuration of control unit 56 of power supply 50. Referring to FIG. 5, control unit 56 includes a comparator CP1 and a short-circuit thyristor drive circuit 58.

Comparator CP1 has its non-inverting input (+terminal) receiving the detected value of input voltage Vin by input voltage monitoring circuit 60 and has its inverting input (−terminal) receiving threshold voltage DCOV. Threshold voltage DCOV is a determination value for determining the input overvoltage state of power supply circuit 54 and is set based on the permissible voltage of power supply circuit 54. Comparator CP1 compares the detected value of input voltage Vin with threshold voltage DCOV and outputs the comparison result. When the detected value of input voltage Vin exceeds threshold voltage DCOV, the output signal of comparator CP1 goes to H (logic high) level. On the other hand, when the detected value of input voltage Vin is equal to or lower than threshold voltage DCOV, the output signal of comparator CP1 goes to L (logic low) level.

Short-circuit thyristor drive circuit 58 generates a firing signal for short-circuit thyristor T1, based on the output signal of comparator CP1. Specifically, when the output signal of comparator CP1 is L level, that is, when Vin≤DCOV, short-circuit thyristor drive circuit 58 determines that power supply circuit 54 is in the normal state with no input overvoltage. When it is determined that power supply circuit 54 is in the normal state, short-circuit thyristor drive circuit 58 does not output a firing signal. Thus, short-circuit thyristor T1 is kept in the off state.

FIG. 6(a) shows the state of power supply 50 when short-circuit thyristor T1 is in the off state. As shown in FIG. 6(a), current is supplied to power supply circuit 54 through current-limiting resistor R1. When input current input to power supply 50 is Iin, input voltage is Vin, and power supplied from DC capacitor C1 to power supply 50 is Pin, supply power Pin is represented by Pin=Vin×Iin. Input current Iin is represented as Iin=(VC−Vin)/R1 using resistance value R1 of current-limiting resistor R1.

Here, when main circuit 30 and power supply 50 are both normal, demand-and-supply balance of power is kept between main circuit 30 and power supply 50. Thus, input voltage Vin falls within a predetermined voltage range. However, when abnormality occurs in at least one of main circuit 30 and power supply 50, the demand-and-supply balance of power is lost so that input voltage Vin becomes a value departing from the predetermined voltage range. When input voltage Vin departs form the voltage range to the low voltage side, power supply circuit 54 fails to generate power supply voltage to cause power supply 50 to stop. In this case, the operation of cell 10 is stopped but the circuit components of power supply 50 and cell control circuit 32 are not destroyed.

By contrast, when input voltage Vin departs from the voltage range to the high voltage side, power supply circuit 54 enters the input overvoltage state, which may destroy the circuit components of power supply circuit 54 and cell control circuit 32. It is therefore necessary to detect the input overvoltage state of power supply circuit 54 and protect the circuit components from the input overvoltage state.

Then in the first embodiment, when the output signal of comparator CP1 shown in FIG. 5 is at H level, that is, when Vin>DCOV, short-circuit thyristor drive circuit 58 determines that power supply circuit 54 is in the input overvoltage state. When it is determined that power supply circuit 54 is in the input overvoltage state, short-circuit thyristor drive circuit 58 outputs a firing signal to turn on short-circuit thyristor T1.

FIG. 6(b) shows the state of power supply 50 when short-circuit thyristor T1 is in the on state. Since first input terminal 54a and second input terminal 54b in power supply circuit 54 are electrically short-circuited, current is supplied to short-circuit thyristor T1 through current-limiting resistor R1. Meanwhile, current supply to power supply circuit 54 is cut off.

Here, the forward voltage (on voltage) when short-circuit thyristor T1 is in the on state is around a few volts at most and is lower than the aforementioned threshold voltage DCOV. Therefore, turning on short-circuit thyristor T1 allows input voltage Vin of power supply circuit 54 to attain a voltage equivalent to the on voltage of short-circuit thyristor T1 and to be reduced to a voltage lower than threshold voltage DCOV. This eliminates the input overvoltage state of power supply circuit 54 and therefore can avoid a failure of the circuit components of power supply circuit 54 and cell control circuit 32.

Short-circuit thyristor T1 turned on is turned off in response to current becoming zero with a firing signal cut off. Therefore, even when a firing signal from control unit 56 is interrupted due to the cutting off of current supply to power supply circuit 54, short-circuit thyristor T1 is kept in the on state, and therefore the input overvoltage state of power supply circuit 54 can be avoided.

Figure 7:
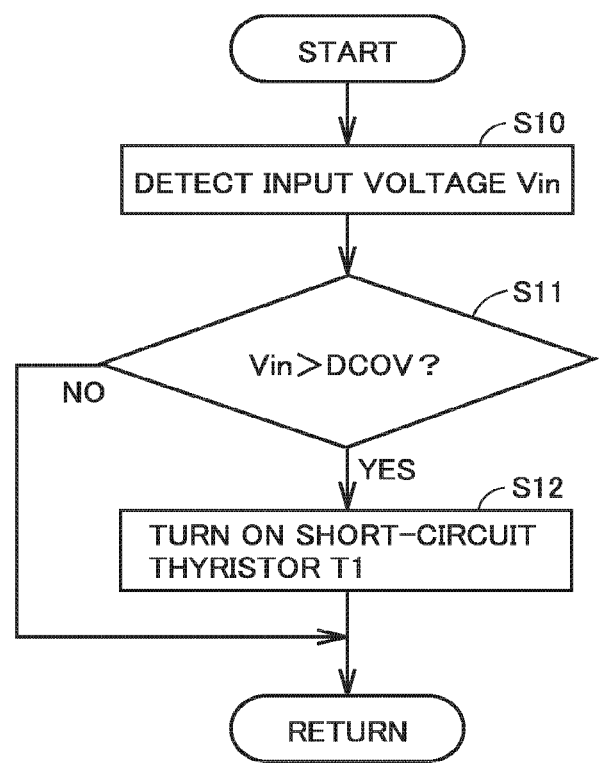
FIG. 7 is a flowchart for explaining the process of detecting input overvoltage in each cell according to the first embodiment.

FIG. 7 is a flowchart for explaining the process of detecting input overvoltage in each cell 10 according to the first embodiment. The flowchart shown in FIG. 7 can be implemented by executing a program stored in advance in control unit 56 of each cell 10.

Referring to FIG. 7, in each cell 10, in step S10, input voltage monitoring circuit 60 detects input voltage Vin of power supply circuit 54. Input voltage monitoring circuit 60 transmits the detected value of input voltage Vin to control unit 56.

In step S11, control unit 56 uses comparator CP1 to determine whether the detected value of input voltage Vin exceeds threshold voltage DCOV. If it is determined that the detected value of input voltage Vin is equal to or lower than threshold voltage DCOV (NO in the determination in S11), control unit 56 determines that power supply circuit 54 is in the normal state, and the process ends.

By contrast, if it is determined that the detected value of input voltage Vin exceeds threshold voltage DCOV (YES in the determination in S11), in step S12, control unit 56 turns on short-circuit thyristor T1.

According to the first embodiment of the present invention, short-circuit thyristor T1 is electrically connected between first input terminal 54*a* and second input terminal 54*b* of power supply circuit 54 provided for each cell 10, and when input overvoltage to power supply circuit 54 is detected, short-circuit thyristor T1 is turned on. This can prevent destruction of the circuit components of power supply circuit 54 and cell control circuit 32 due to input overvoltage of power supply circuit 54.

Second Embodiment

Figure 8:
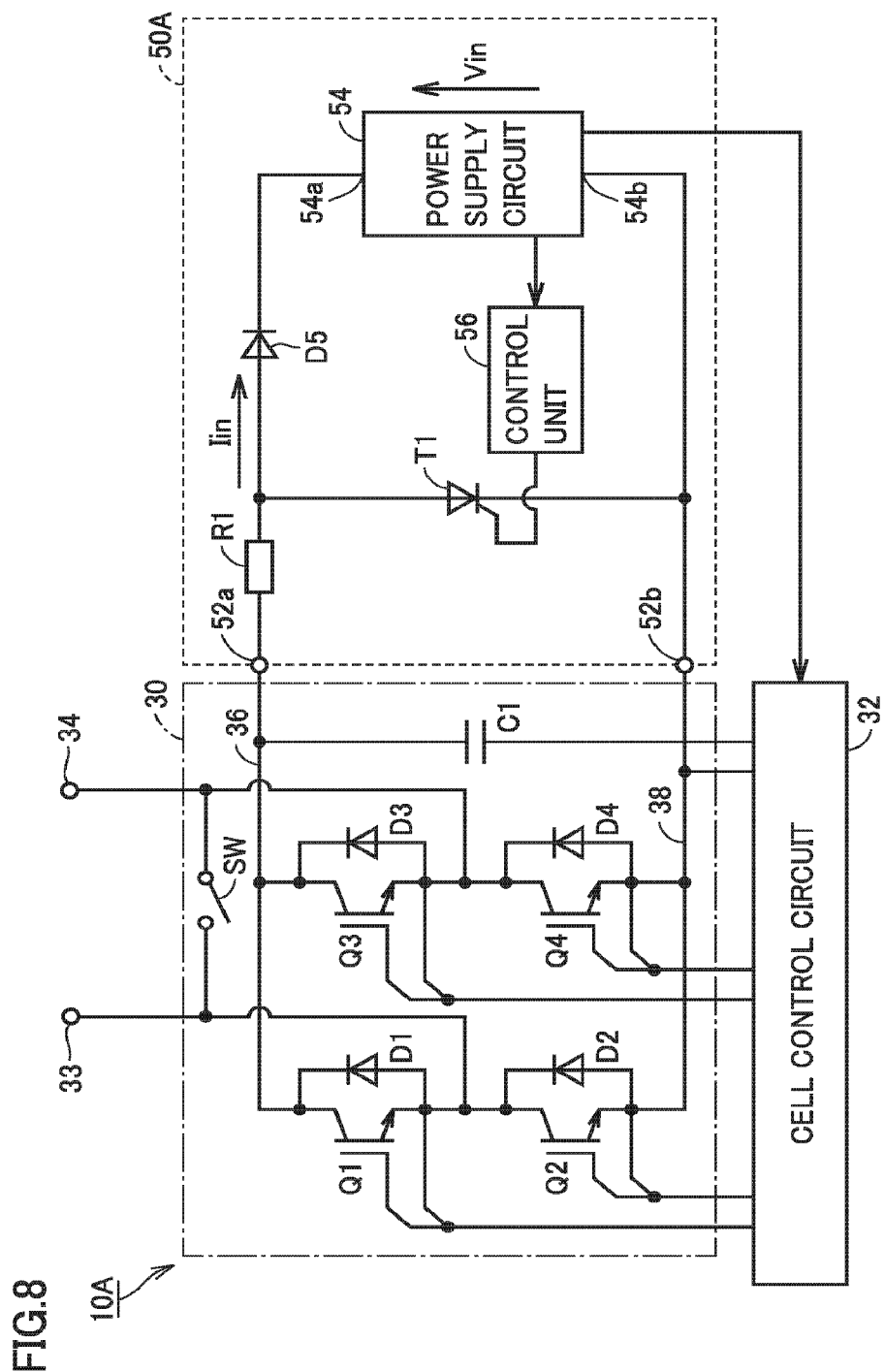
FIG. 8 is a diagram showing a configuration of a cell in a power conversion device according to a second embodiment of the present invention.

FIG. 8 is a diagram showing a configuration of a cell in a power conversion device according to a second embodiment of the present invention. Referring to FIG. 8, the configuration of the power conversion device according to the second embodiment is similar to that of FIG. 1 except the configuration of the cell, and a detailed description will not be repeated.

Referring to FIG. 8, a cell 10A according to the second embodiment includes a power supply 50A instead of power supply 50 in cell 10 shown in FIG. 2. Power supply 50A additionally includes a reverse current blocking diode D5 in power supply 50.

Diode D5 is connected between the anode and the cathode of short-circuit thyristor T1 electrically in series with power supply circuit 54. Diode D5 has its anode electrically connected to current-limiting resistor R1 and its cathode electrically connected to first input terminal 54*a* of power supply circuit 54. Diode D5 prevents reverse flow of current from power supply circuit 54 to short-circuit thyristor T1.

Figure 9:
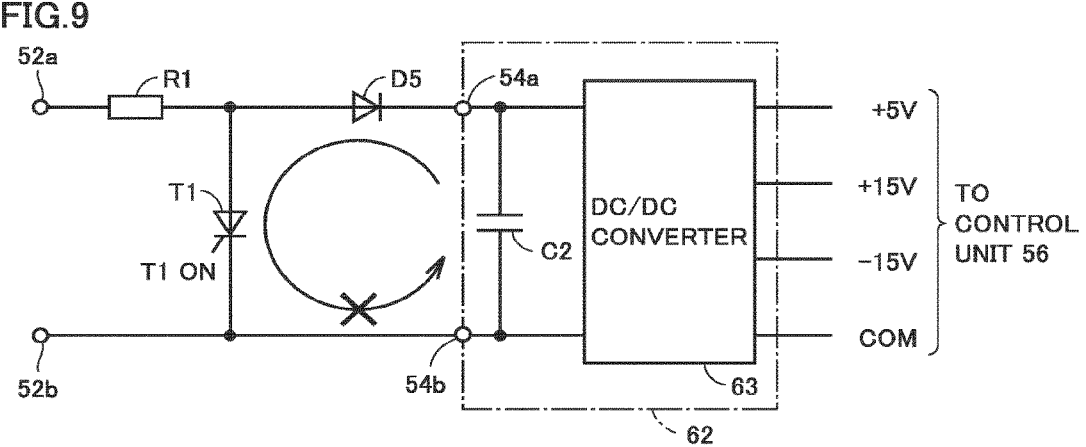
FIG. 9 is a diagram showing a state of the power supply when the short-circuit thyristor is in the on state.

FIG. 9 shows a state of power supply 50A when short-circuit thyristor T1 is in the on state. Referring to FIG. 9, first power supply unit 62 for supplying power supply voltage of control unit 56 includes a smoothing capacitor C2 and a DC/DC converter 63. Capacitor C2 is electrically connected between first input terminal 54*a* and second input terminal 54*b*. DC/DC converter 63 converts the terminal-to-terminal voltage of capacitor C2 into power supply voltage to be supplied to each unit of control unit 56. In FIG. 9, four voltages, namely, +5 V, +15 V, −15 V, and COM (ground voltage), are generated as power supply voltage of control unit 56, by way of illustration. Although not shown, second power supply unit 64, third power supply unit 66, fourth power supply unit 68, and fifth power supply unit 70 differ in magnitude of power supply voltage but each has the same basic configuration as first power supply unit 62.

Here, it is assumed that diode D5 is not provided. In this case, when short-circuit thyristor T1 is turned on, a path is formed to allow current to flow such that charge stored in capacitor C2 is discharged, as shown by the arrow in the figure, in the inside of power supply circuit 54. The discharging of capacitor C2 reduces the terminal-to-terminal voltage of capacitor C2, and then the power supply voltage output from DC/DC converter 63 is also reduced.

Therefore, in each unit of control unit 56, the power supply voltage may fall under the operation guaranteed voltage, possibly resulting in an inoperative state of control unit 56. Also in gate drive circuits 40, 42, switch operating circuit 44, voltage sensor 46, and I/F circuit 48, power supply voltage may be reduced, resulting in an inoperative state in the same manner as in control unit 56.

In cell 10A according to the second embodiment, diode D5 fulfills the function of suppressing discharging of capacitor C2 as described above. Thus, even after short-circuit thyristor T1 is tuned on, power supply circuit 54 can supply power supply voltage to each of control unit 56 and cell control circuit 32. That is, even after short-circuit thyristor T1 is turned on, control unit 56 and cell control circuit 32 can be operative.

Figure 10:
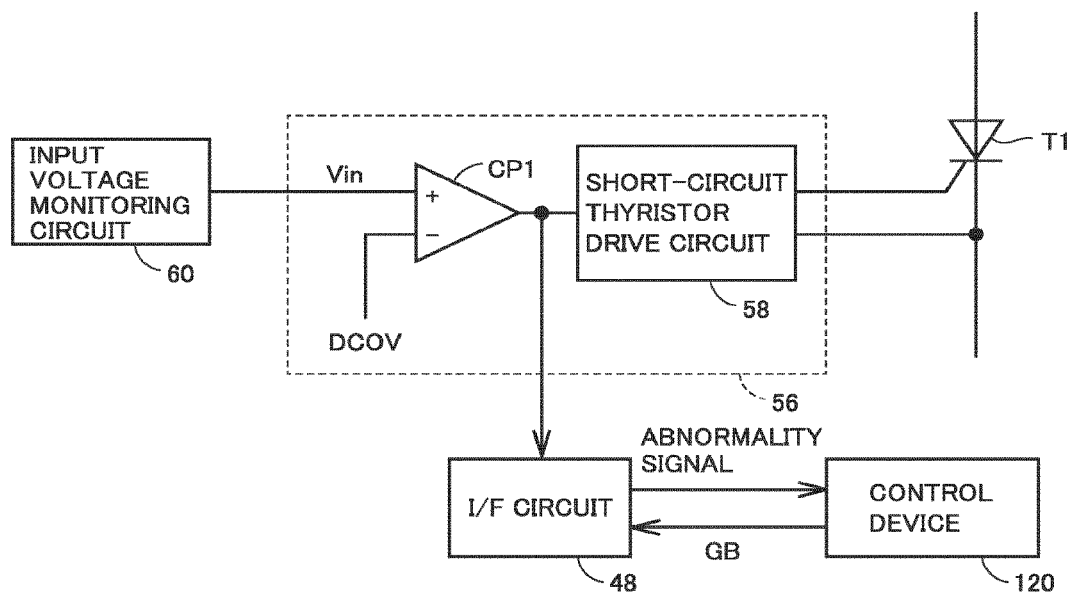
FIG. 10 is a block diagram showing a configuration of the control unit of the power supply according to the second embodiment.

With such a configuration, as shown in FIG. 10, in cell control circuit 32, I/F circuit 48 can inform control device 120 on the higher level that power supply circuit 54 of its cell 10A falls into the input overvoltage state. Specifically, the output signal of comparator CP1 is applied to short-circuit thyristor drive circuit 58 and I/F circuit 48. When receiving the output signal activated to H level from comparator CP1, I/F circuit 48 generates a signal indicating the abnormality of its cell (abnormality signal) and transmits the generated signal to control device 120.

Control device 120 receives the abnormality signal from I/F circuit 48 to detect that power supply circuit 54 is in the input overvoltage state in a certain cell 10A. In this case, control device 120 generates gate block signal GB for all cells 10A included in MMC 110. This can set all cells 10A in MN/IC 110 to the gate block state.

Figure 11:
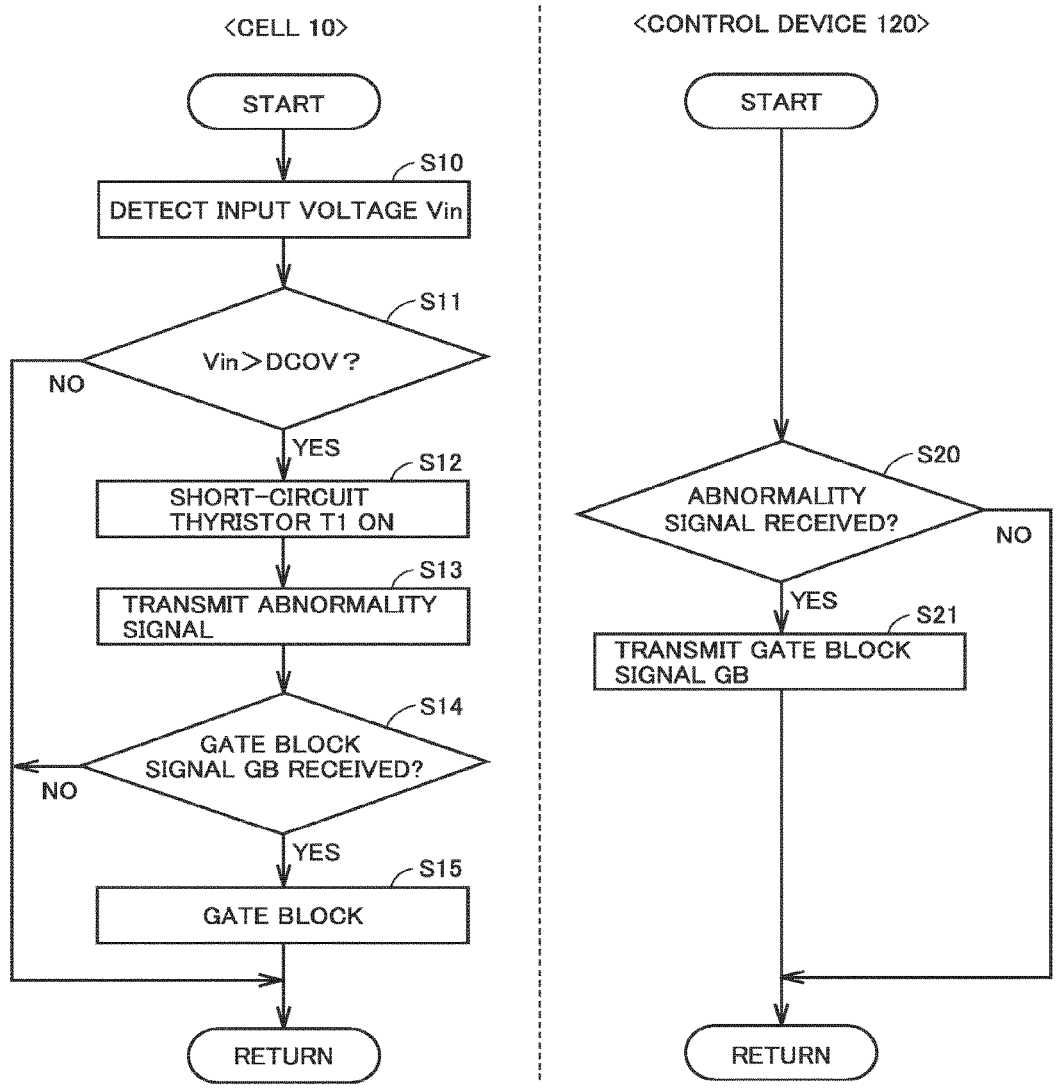
FIG. 11 is a flowchart for explaining the process of detecting input overvoltage in each cell according to the second embodiment.

FIG. 11 is a flowchart for explaining the process of detecting input overvoltage in each cell 10A. The flowchart shown in FIG. 11 can be implemented by executing a program stored in advance in control unit 56 and cell control circuit 32 in each cell 10A.

Referring to FIG. 11, input voltage monitoring circuit 60 and control unit 56 execute steps S10 to S12 similar to those in FIG. 7, and if it is determined that the detected value of input voltage Vin exceeds threshold voltage DCOV, short-circuit thyristor T1 is turned on.

If it is determined that the detected value of input voltage Vin exceeds threshold voltage DCOV (YES in the determination in S11), in step S13, I/F circuit 48 transmits an abnormality signal indicating the abnormality of its cell 10A to control device 120.

When receiving the abnormality signal (YES in the determination in S20), in step S21, control device 120 generates gate block signal GB for all cells 10A included in MMC 110.

In each cell 10A, I/F circuit 48 determines whether gate block signal GB has been received from control device 120. If it is determined that gate block signal GB has been received (YES in the determination in S14), the process proceeds to step S15, and I/F circuit 48 outputs gate block signal GB to gate drive circuits 40, 42. Gate drive circuits 40, 42 supply gate block signal GB to the gates of switching elements Q1 to Q4 to set main circuit 30 to the gate block state.

On the other hand, if it is determined that gate block signal GB has not been received (NO in the determination in S14), I/F circuit 48 determines that abnormality of cell 10A does not occur, and the process ends.

According to the second embodiment of the present invention, in each cell 10A, short-circuit thyristor T1 is electrically connected between first input terminal 54a and second input terminal 54b of power supply circuit 54, and diode D1 is connected for preventing reverse flow of current from power supply circuit 54 to short-circuit thyristor T1. This can prevent destruction of the circuit components of power supply circuit 54 and cell control circuit 32 when input overvoltage to power supply circuit 54 is detected. In addition, even after detection of input overvoltage, control unit 56 and cell control circuit 32 can be kept in an operative state. Accordingly, cell control circuit 32 can inform control device 120 of the abnormality of its cell to allow control device 120 to take measures for protection of MMC 110 (for example, gate block in all cells 10A). As a result, the availability of power conversion device 100 can be improved.

Third Embodiment

As described in the first embodiment, one of the causes of the input overvoltage state of power supply circuit 54 is abnormality of main circuit 30 or abnormality of power supply 50. One of abnormalities of main circuit 30 is overcharge of DC capacitor C1.

Overcharge of DC capacitor C1 may occur when main circuit 30 is in the stop state (switching elements Q1 to Q4 are in the off state). This is because current flows to charge DC capacitor C1 in the inside of main circuit 30 in the stop state.

Figure 12:
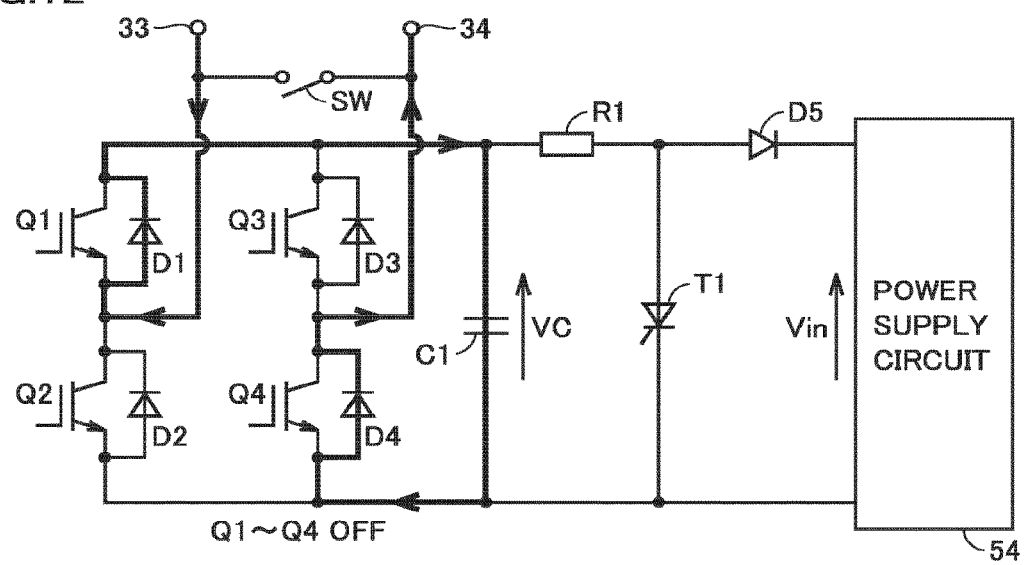
FIG. 12 is a diagram for explaining overcharge of the DC capacitor in the main circuit.

More specifically, as shown in FIG. 12, when switching elements Q1 to Q4 are in the off state, as shown by the arrows in the figure, a path is formed to allow current flow through first terminal 33, diode D1, DC capacitor C1, diode D4, and second terminal 34. Charge is stored in DC capacitor C1 via this current path to increase voltage VC of DC capacitor C1.

Such overcharge of DC capacitor C1 may occur when, for example, main circuit 30 enters the stop state in some cells 10A of a plurality of cell 10A connected in series in one arm A in MMC 110 (FIG. 2) while main circuit 30 is kept in the operative state in the remaining cells 10A.

When voltage VC of DC capacitor C1 increases to cause input voltage Vin to exceed threshold voltage DCOV, short-circuit thyristor T1 is turned on as described above, thereby avoiding a failure of the circuit components of power supply circuit 54 and cell control circuit 32. However, in main circuit 30, since current continues to flow through the path shown in FIG. 12, DC capacitor C1 is kept charged. As a result, voltage VC of DC capacitor C1 further increases to apply overvoltage exceeding the withstand voltage to switching elements Q1 to Q4, which may result in damage of switching elements Q1 to Q4.

Figure 13:
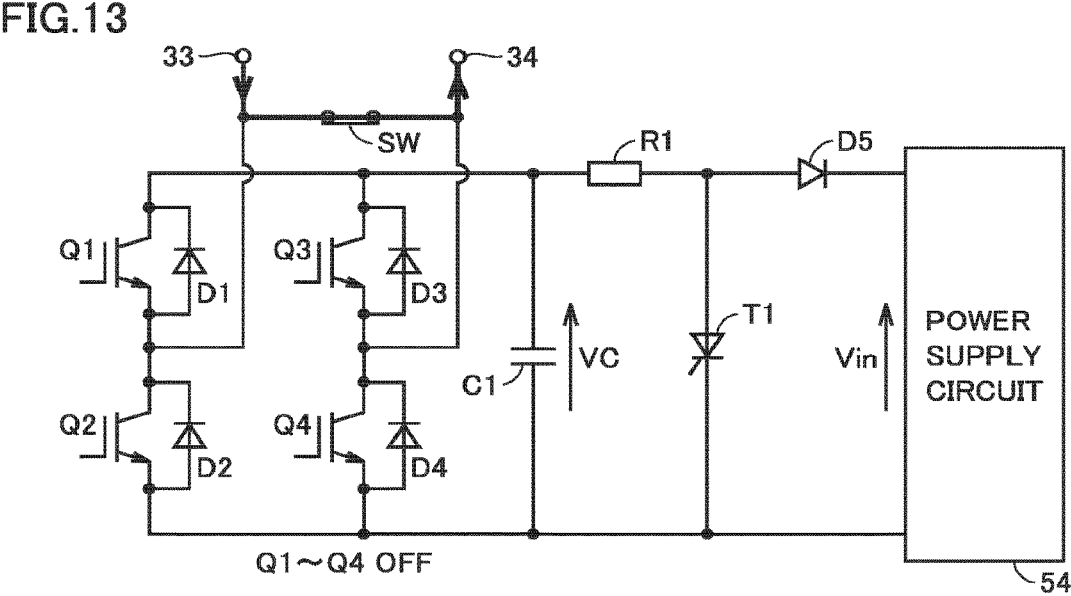
FIG. 13 is a diagram showing a state of the main circuit when the switch is in the on state.

In the third embodiment, when it is determined that power supply circuit 54 is in the input overvoltage state in cell 10A according to the foregoing second embodiment, short-circuit thyristor T1 is turned on and switch SW is turned on. As shown in FIG. 13, switch SW is turned on to electrically short-circuit first terminal 33 and second terminal 34, thereby preventing formation of a charging path for accumulating charge in DC capacitor C1.

Figure 14:
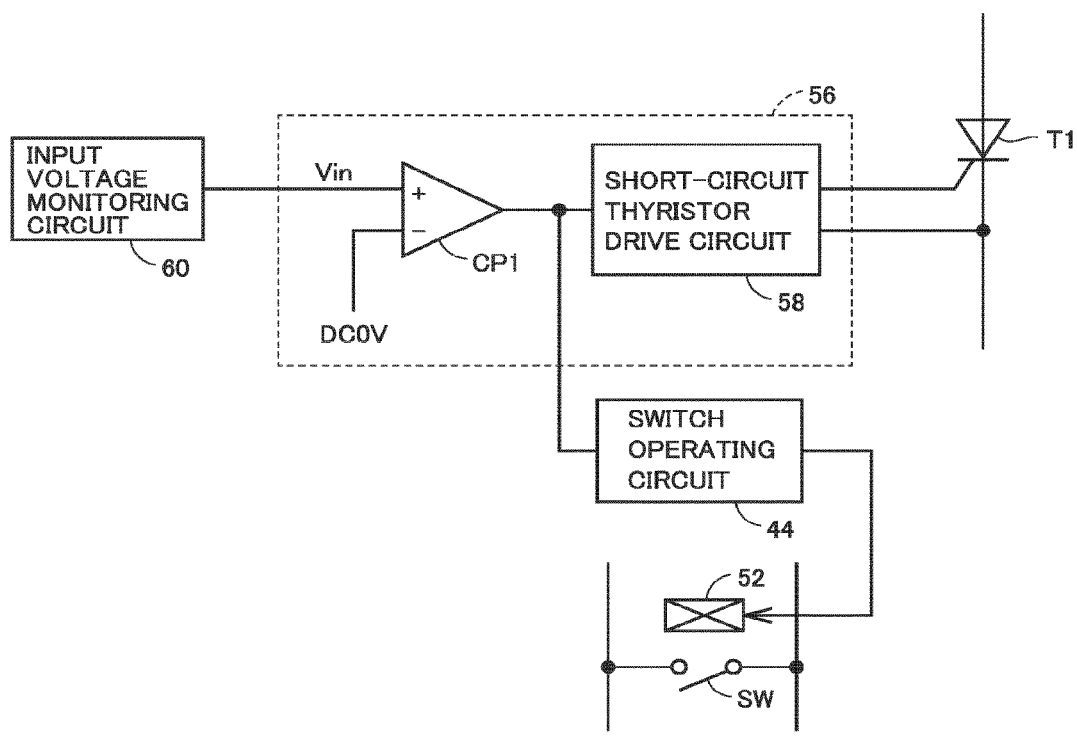
FIG. 14 is a block diagram showing a configuration of the control unit of the power supply according to a third embodiment.

It is necessary that the configuration of the cell according to the third embodiment should be similar to that of FIG. 7. That is, reverse current blocking diode D5 is provided in power supply 50A of cell 10A. With this configuration, since power supply voltage is supplied to switch operating circuit 44 even after detection of input overvoltage, switch operating circuit 44 can be operative. Therefore, as shown in FIG. 14, switch operating circuit 44 can turn on switch SW in response to reception of the output signal activated to H level from comparator CP1.

Also in the third embodiment, I/F circuit 48 can inform control device 120 that power supply circuit 54 of its cell falls into the input overvoltage state, in the same manner as in the second embodiment. Thus, control device 120 can take measures for protection of MMC 110.

Figure 15:
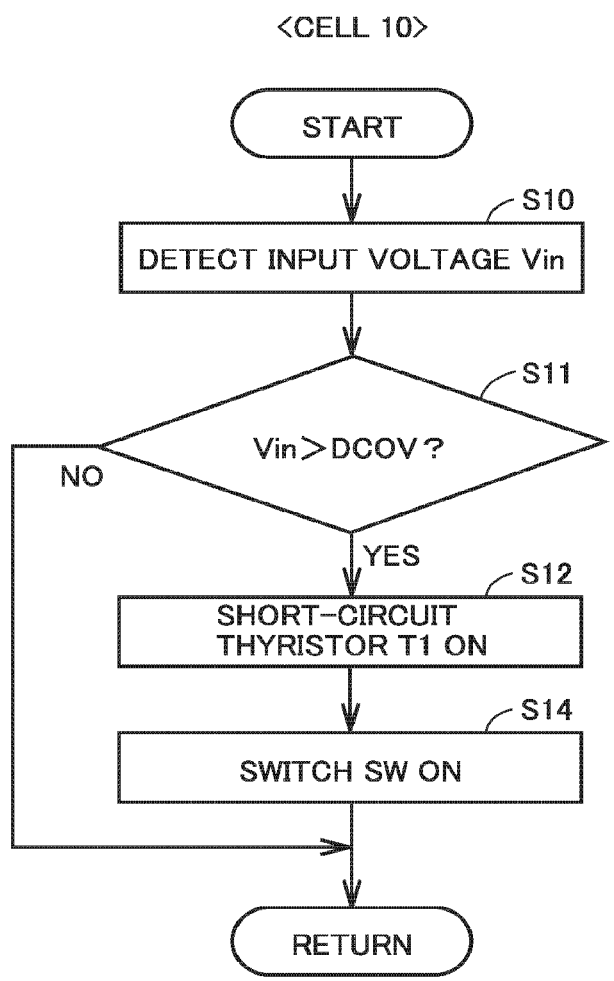
FIG. 15 is a flowchart for explaining the process of detecting input overvoltage in each cell according to the third embodiment.

FIG. 15 is a flowchart for explaining the process of detecting input overvoltage in each cell 10A. The flowchart shown in FIG. 15 can be implemented by executing a program stored in advance in control unit 56 and cell control circuit 32 of each cell 10A.

Referring to FIG. 15, input voltage monitoring circuit 60 and control unit 56 execute steps S10 to S12 similar to those in FIG. 7 and, if it is determined that the detected value of input voltage Vin exceeds threshold voltage DCOV, short-circuit thyristor T1 is turned on.

If it is determined that the detected value of input voltage Vin exceeds threshold voltage DCOV (YES in the determination in S11), in step S14, switch operating circuit 44 turns on switch SW.

According to the third embodiment of the present invention, when input overvoltage to power supply circuit 54 is detected, short-circuit thyristor T1 is turned on and switch SW inside main circuit 30 is turned on, thereby preventing destruction of the circuit components of power supply circuit 54 and cell control circuit 32 and preventing overcharge of DC capacitor C1.

[Modification of Power Conversion Device]

Although main circuit 30 in cell 10 (or 10A) includes a full-bridge circuit in the foregoing embodiments, main circuit 30 may include a bidirectional chopper circuit.

FIG. 16 is a diagram showing another configuration example of cell 10 shown in FIG. 1. Referring to FIG. 16, a cell 10B according to the present modification includes a main circuit 30B, a cell control circuit 32B, and a power supply 50. Main circuit 30B is configured with a bidirectional chopper circuit including a DC capacitor. Specifically, main circuit 30B is a two-terminal circuit having a first terminal 33 and a second terminal 34 and includes switching elements Q1, Q2, diodes D1, D2, and a DC capacitor C1. Also in the present modification, switch SW is connected between first terminal 33 and second terminal 34.

Although three-phase MMC 110 connected to a three-phase AC power system is illustrated as a power converter in the foregoing embodiments, the present invention is also applicable to a single-phase MMC connected to a single-phase power system or an MMC for driving a motor. In the present invention, a double Y-connected MMC has been illustrated, in which six single-phase converters, each formed of a series of an arm including one or more cascaded cells and a reactor, are connected double in Y configuration. However, the present invention is also applicable to a D-connected MMC including three connected in delta configuration or a Y-connected MMC including three single-phase converters connected in Y configuration.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

1 AC power system, 2 three-phase transformer, 3a positive voltage terminal, 3b negative voltage terminal, 3c to 3c AC terminal, 4 load, 10, 10A, 10B unit converter (cell), 30 main circuit, 32, 32A control circuit, 33 first terminal, 34 second terminal, 36 positive electrode line, 38 negative electrode line, 40, 42 gate drive circuit, 44 switch operating circuit, 46 voltage sensor, 48 I/F circuit, 50, 50A power supply, 52 excitation coil, 54 power supply circuit, 54a first input terminal, 54b second input terminal, 56 control unit, 58 short-circuit thyristor drive circuit, 60 input voltage monitoring circuit, 62 first power supply unit, 63 DC/DC converter, 64 second power supply unit, 66 third power supply unit, 68 fourth power supply unit, 70 fifth power supply unit, 100 power conversion device, 110 MMC, 120 control device, A1 to A6 arm, C1 DC capacitor, C2 smoothing capacitor, L1 to L6 reactor, GC gate signal, GB gate block signal, Q1 to Q4 switching element, D1 to D5 diode, SW switch, T1 short-circuit thyristor, CP1 comparator, DCOV threshold voltage

The invention claimed is:

1. A power conversion device comprising:
a power converter including an arm configured with one unit converter or a plurality of unit converters connected in series; and
a control device configured to control the power converter,
the unit converter including
a main circuit including a switching element and a DC capacitor and configured to output a voltage pulse according to voltage of the DC capacitor by turning on/off of the switching element,
a control circuit configured to control on/off of the switching element in accordance with a control signal received from the control device, and
a power supply configured to lower voltage of the DC capacitor to generate power supply voltage to be supplied to the control circuit, the power supply including
a power supply circuit configured to convert input voltage provided between first and second input terminals from the DC capacitor into the power supply voltage,
a thyristor connected between the first and second input terminals electrically in parallel with the power supply circuit,
a current-limiting resistor connected between terminals of the DC capacitor electrically in series with the thyristor, and
a control unit configured to fire the thyristor when the input voltage applied to the power supply circuit exceeds a threshold voltage,
wherein the power supply further includes a reverse current blocking diode connected between an anode and a cathode of the thyristor electrically in series with the power supply circuit to prevent reverse flow of current from the power supply circuit to the thyristor.

2. The power conversion device according to claim 1, wherein when the input voltage applied to the power supply circuit exceeds a threshold voltage, the control circuit receives supply of power supply voltage from the power supply to transmit a signal indicating abnormality of the unit converter to the control device, and
the control device is configured to transmit the control signal for fixing the switching element to an off state to the control circuit of each of the unit converters, when receiving a signal indicting abnormality of the unit converter from any one of the one unit converter or a plurality of unit converters.

3. The power conversion device according to claim 1, wherein the unit converter further includes a switch configured to turn on in response to an on command from the control circuit to short-circuit output terminals of the main circuit, and
the control circuit outputs the on command to the switch when the input voltage of the power supply circuit exceeds the threshold voltage.

4. The power conversion device according to claim 2, wherein
the unit converter further includes a switch configured to turn on in response to an on command from the control circuit to short-circuit output terminals of the main circuit, and
the control circuit outputs the on command to the switch when the input voltage of the power supply circuit exceeds the threshold voltage.

* * * * *